Dec. 24, 1968   L. H. MERRILL ETAL   3,417,542
DESICCANT CAPSULE FEEDING MACHINE
Filed Nov. 26, 1965   3 Sheets-Sheet 1

INVENTORS:
LELAND H. MERRILL
CHARLES F. BROSS

BY
ATT'YS

Dec. 24, 1968   L. H. MERRILL ET AL   3,417,542
DESICCANT CAPSULE FEEDING MACHINE

Filed Nov. 26, 1965   3 Sheets-Sheet 2

INVENTORS:
LELAND H. MERRILL
CHARLES F. BROSS

ATT'YS

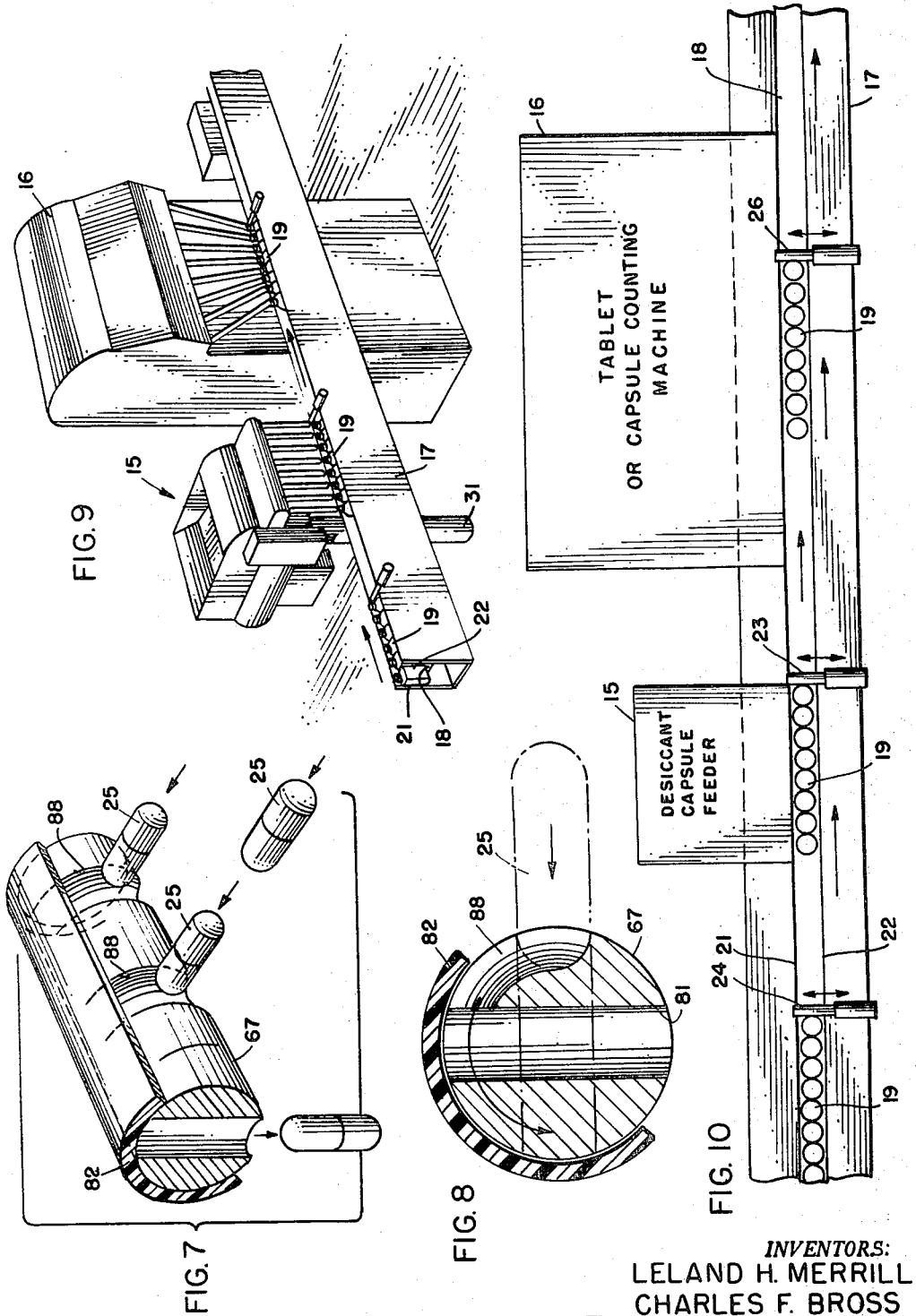

United States Patent Office 3,417,542
Patented Dec. 24, 1968

3,417,542
DESICCANT CAPSULE FEEDING MACHINE
Leland H. Merrill and Charles F. Bross, Chicago, Ill., assignors, by direct and mesne assignments, to Merrill Machinery Company, Chicago, Ill., a corporation of Illinois
Filed Nov. 26, 1965, Ser. No. 516,203
4 Claims. (Cl. 53—78)

ABSTRACT OF THE DISCLOSURE

Apparatus for feeding capsules containing a dessicant, to containers incident to movement of the containers thru a tablet or capsule counting and packaging mechanism. The capsules move down a series of tracks to an oscillating discharge bar containing a series of spaced pockets aligned with the tracks for receiving the capsules and rocking them approximately 90° to discharge whereby a single capsule is discharged into a container.

---

This invention relates generally to machines for feeding capsules or tablets, and more particularly to a machine for feeding a desiccant capsule or tablet to a container which is later filled with a counted number of capsules or tablets of another kind.

Many pharmaceuticals are hygroscopic in nature, and to eliminate damage to the capsules by moisture-laden air, each container is desirably packed with a suitable desiccant capsule before the counted capsules are placed therein. The invention herein is accordingly directed to apparatus for introducing a desiccant capsule into a container, which apparatus may be arranged for use with adjacent apparatus for counting tablets and capsules and directing such tablets and/or capsules to bottles and/or other packaging media.

According to the present invention, the desiccant capsules are supplied to a feed hopper having a hopper bottom provided with capsule guides which receive the capsules in end to end relationship. The hopper bottom preferably has a sloping bottom and is vibrated in such a fashion that the capsules slide down the guides. A rotating paddle turns on an axis spaced from the capsules and normal to the axis thereof, and the edges of the paddle blades are spaced from the capsules so as not to disturb them in their guides, but so as to move the excess unguided capsules away from the discharge end of the hopper bottom. An oscillating capsule-receiving-and-discharge bar is mounted at the lower or discharge end of the hopper bottom, and rocks about an axis normal to the axis of the guides. The bar has capsule receiving pockets aligned with the guides to receive the capsules and discharge each capsule into a chute aligned with a receiving container. Structure is provided for rocking the bar when the containers are in position to receive the capsules, and the rocking movement is timed suitably with structure for stopping the container for loading of the desiccant capsules as they move on a conveyor.

Another object is to provide a machine characterized by a feed hopper having a vibrating bottom adapted to arrange capsules in side by side rows or guides, and to feed the capsules from the hopper bottom to a capsule receiving member having a plurality of capsule receiving pockets therein, and adapted to rock to a discharge position and to release the capsules into containers.

Still another object is to provide a capsule feeding machine comprising a feed hopper having a pitched or inclined bottom provided with guides therein for capsules arranged in end to end relationship, and to provide structure for receiving the lowermost tier of such capsules and for discharging them into containers.

Yet another object is to provide mechanism for receiving capsules guided in end to end fashion and for discharging the same, at the same time holding a next tier in readiness for being received in the mechanism, and to rock the mechanism between capsule receiving and discharging positions according to the proper positioning of containers for receiving the capsules.

In the drawings:

FIG. 7 is a perspective view showing the capsule receiving and discharging mechanism in discharge position and showing the capsules of a following tier moving into position for reception into said mechanism;

FIG. 8 is a section taken through the capsule receiving and discharging mechanism showing the manner in which the capsules of the bottommost tier are in position to be received by the mechanism;

FIG. 9 is a perspective view showing the machine according to the present invention employed in connection with a capsule or tablet counting machine; and FIG. 10 is a plan view of FIG. 9.

Figure 1:
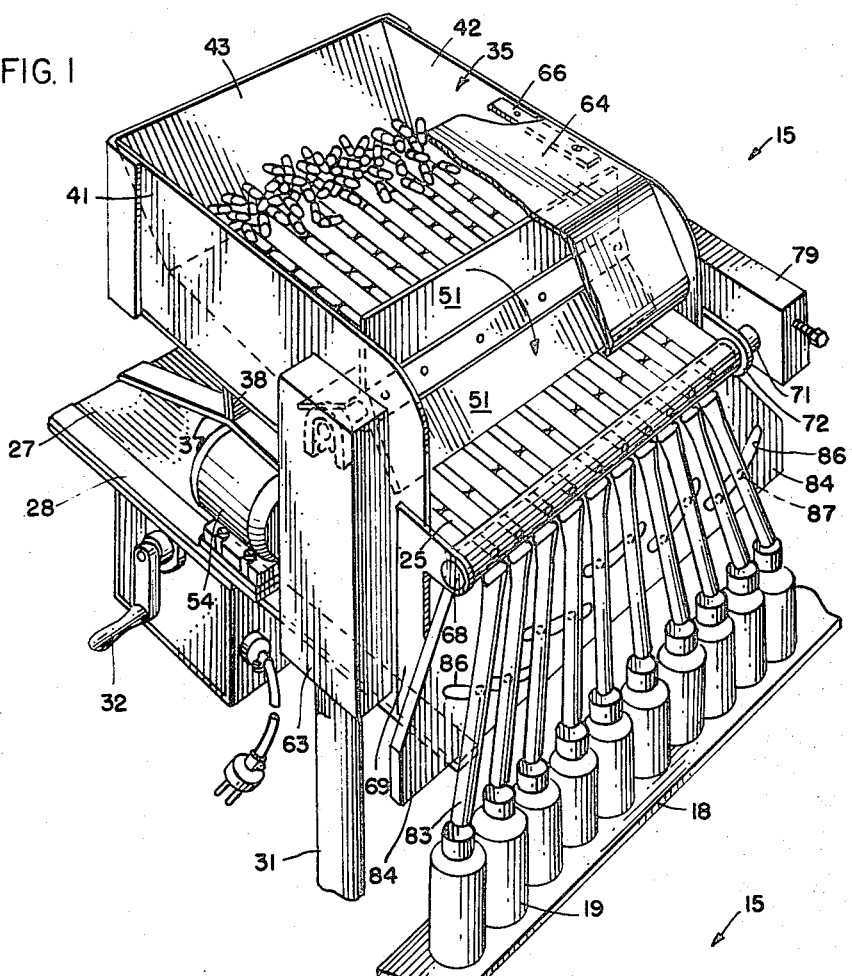
FIG. 1 is a perspective view of a capsule or tablet feeding machine constructed in accordance with the present invention.
Figure 2:
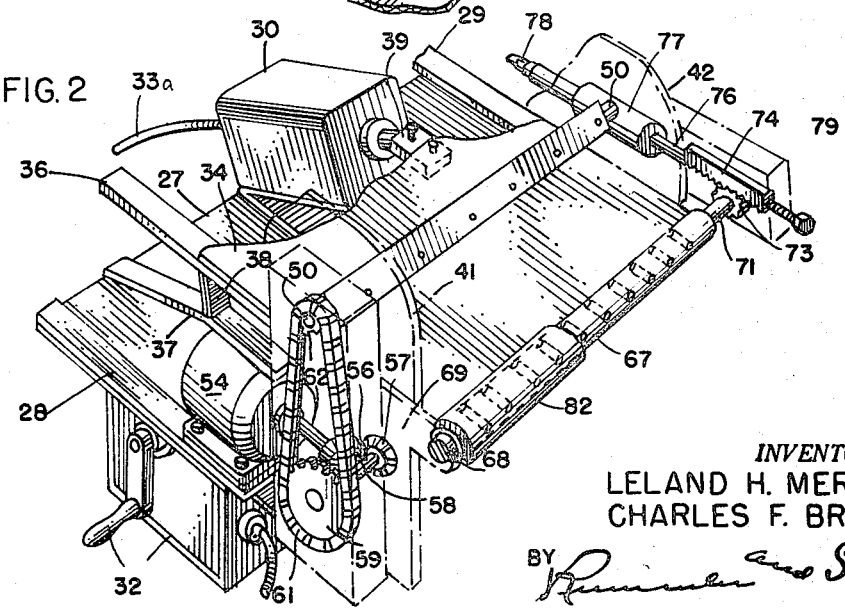
FIG. 2 is a perspective view of a portion of the machine seen in FIG. 1, showing details of mechanism for vibrating the hopper bottom thereof, and mechanism for rocking the capsule-receiving mechanism between capsule-receiving and capsule-discharging positions.

Referring now particularly to FIGS. 1 and 2 of the drawings, the capsule feeding machine according to the present invention is referred to generally by the reference numeral 15, and may be employed in connection with a tablet or capsule counting machine 16, see FIGS. 9 and 10. The machine 15 is shown in juxtaposition to a tablet counting machine 16, and each is arranged to one side of a conveyor 17 having a conveying reach 18 in the form of an endless belt adapted to convey groups of containers 19 thereon. The conveyor 18 is guided between upright guides 21 and 22 which serve also to guide the containers 19.

The containers 19 are arranged to be filled in groups as shown at a station beneath the machine 15, being held thereat by a stop finger 23 for the filling operation. The containers 19 are also held in readiness on the conveying reach for a subsequent filling operation at the machine 15 by a similar stop finger 24, which serves to count or separate the containers 19 into like numbered groups, eight containers constituting a group as seen in FIGS. 9 and 10.

During the filling operation at the machine 15, the conveying reach 18 slides beneath the containers 19 while being held by the stop finger 23, and at the conclusion of the filling operation at the machine 15, the conveyor reach 18 moves the group of containers 19 which have now been filled with a desiccant capsule 25 seen in the several views, the groups of containers 19 moving by means of the conveyor reach 18 to a position beneath the counting and feeding machine 16, being held in proper position thereat by a stop finger 26.

The stop fingers 23, 24 and 26 may be pneumatically or hydraulically operated as desired.

Referring now again to FIGS. 1 and 2 of the drawings, the capsule or tablet feeding machine 15 includes a base frame member 27 having laterally spaced side extensions 28 and 29, which are supported upon a standard 31, see also FIG. 9. Structure 32 secured to the extensions 28 and 29, and cooperating with the standards 31, is provided for raising and lowering the frame 27 and its extensions 28 and 29 in accordance with the height of the containers 19.

The main frame 27 provides a support for a vibrator 30 receiving its power from a control box 33 mounted on the underside of the frame extensions 28, there being a power cable 33a from the control box 33 to the vibrator 30. A feed hopper indicated generally by the reference numeral 35 has a hopper bottom 34, the sides of which are secured to laterally spaced stringer members 36. Each stringer member 36 is secured to a stringer member 37 by a vertical connecting web 38, and each stringer member 37 is adapted to rest upon the main frame 27. A connection 39 is provided between the hopper bottom 34 and the vibrator 30, which is rigidly secured to the frame 27 so that the hopper bottom 34 can vibrate with respect to the frame 27.

Figure 6:
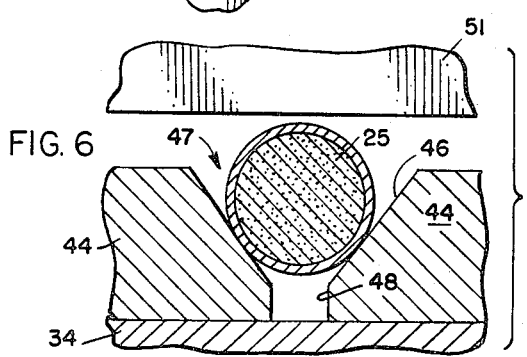
FIG. 6 is a sectional view taken along the line 6—6 of FIG. 3, looking in the direction of the arrows.

The hopper 35 has side walls 41 and 42 which extend upward from the stringer members 36, and a rear wall 43 extending between the side walls 41 and 42 in the manner as seen in FIG. 1. The hopper bottom 34 is provided with a plurality of spaced guides 44 which can be secured to the hopper bottom 34 in any convenient manner. The guides 44 are bevelled lengthwise thereof as at 46, see FIG. 6, to provide side-by-side passage-ways 47 for rows of desiccant capsules 25. Clearance 48 is afforded between the guides 44 to provide spaces for dust and small particles shaken from the capsules 25.

It will be noted that the hopper bottom 34 as well as the guides 44 slope downwardly from the rear wall 43 of the hopper 35. The action of the vibrator 30 is such as to cause the capsules 25 to orient themselves in end to end relationship along the guideways 47 and to be vibrated in a downhill direction.

Figure 3:
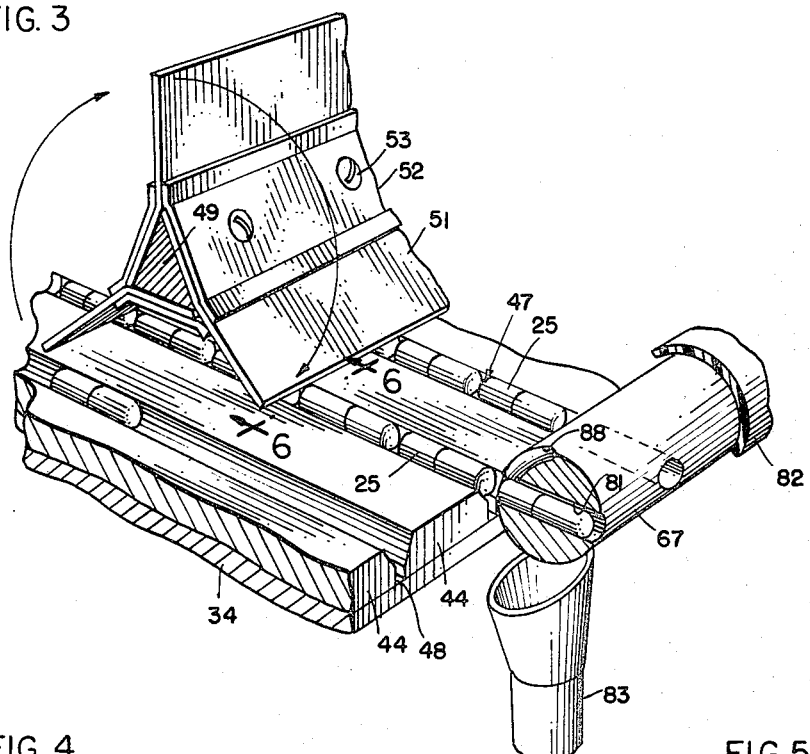
FIG. 3 is a detailed perspective view showing structure for assisting the arrangement of the capsules in end to end relationship in the guides in the hopper bottom, and showing also the capsule receiving and discharging mechanism in its capsule receiving position.
Figure 4:
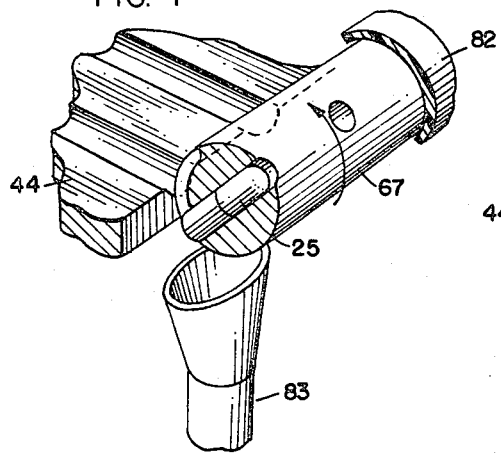
FIG. 4 is a perspective view showing the capsule receiving and discharging mechanism in its movement to discharge position.

Mechanism is provided for assisting the proper orientation of the capsules 25 in the guideways 47 and for holding back those capsules which have not become aligned within the guideways 47. To this end an arbor 49, see FIG. 3, preferably with a cross section in the form of an equilateral triangle is provided with end trunnions 50 journalled in the side walls 41 and 42 of the hopper 35. The arbor 49 supports flexible rubber paddles 51 which are held thereto by means of retainer plates 52 held in position to arbor 49 by screws 53.

A motor 54 for turning the arbor 49 and paddles 51 is mounted on one of the rails 28 and drives a bevel pinion 56 meshing with a bevel pinion 57 fast on a shaft 58 journalled in the side frame 41. Shaft 58 supports a sprocket 59, and a sprocket chain 61 is trained between the sprocket 59 and a driven sprocket 62 fast on the trunnion 50. The arbor 49 rotates in the direction seen in FIG. 3, and the paddles 51 serve to hold back those capsules 25 which are not guided in the guideways 47. It will be noted from FIG. 6 that the paddles 51 do not contact those capsules which are being properly guided in the guideways 47, the paddles 51 thereby not disturbing the arrangement of the capsules in their guideways 47.

A suitable housing 63 is provided for the sprockets 59 and 62 and the sprocket chain 61, and is secured to the side frame 41 in any convenient manner. Likewise, the paddles 51 are suitably enclosed by a cover plate 64 held at its sides to angles 66 supported on the inside of the respective side frames 41 and 42. As seen in FIG. 1, the cover plate 64 extends partway over the hopper 35 and down to a position close to the guided capsules 25.

Mechanism is provided for receiving the bottom-most tier of capsules positioned in the side by side guides 47, and to this end there is provided an oscillating capsule receiving and discharging bar 67 having a trunnion 58 at one end thereof received in a bracket arm 69 extending from the side frame 41. The other end of the bar 67 has a trunnion 71 received in a bracket arm 72 extending from the frame 42. Trunnion 71 has a pinion 73 fast thereon which cooperates with a rack 74 formed as part of a piston rod 76 moving within a double acting cylinder 77.

As seen in FIG. 2, an air supply hose 78 is connected to the cylinder 77. The action of air pressure is such as to rock the bar 67 to a capsule receiving position as seen in FIG. 2. The cylinder 77 may desirably be of the single acting variety and encloses a return spring, not shown, for rocking the bar 67 to a discharge position upon the release of the air at the fitting 78. Obviously, the cylinder 77 can be of the double acting variety, if desired. The rack and pinion assembly 73, 74 may be suitably enclosed in a housing 79 secured to the side frame 42 of the hopper 35.

Referring now paticularly to FIGS. 4, 5, 7 and 8 of the drawings, the capsule receiving and discharging bar 67 has a plurality of diametrically extending bores or pockets 81 therein, the diameter of each pocket 81 being desirably slightly larger than the diameter of the capsule 25. Each pocket 81 is in alignment with the guideways 47 for the capsules 25, and when the bar 67 is in the position seen in FIG. 3, the vibration of the hopper bottom 34 and the slope thereof causes the capsules in the bottommost tier to move into the pocket 81.

A stop 82 is provided for the capsules 25, and is in the form of a semicircular sleeve held at each end by the respective bracket arms 69 and 72. The sleeve 82 provides structure whereby the capsules 35 are retained within the bar until the rocking movement thereof to the discharge position seen in FIGS. 4 and 5.

Figure 5:
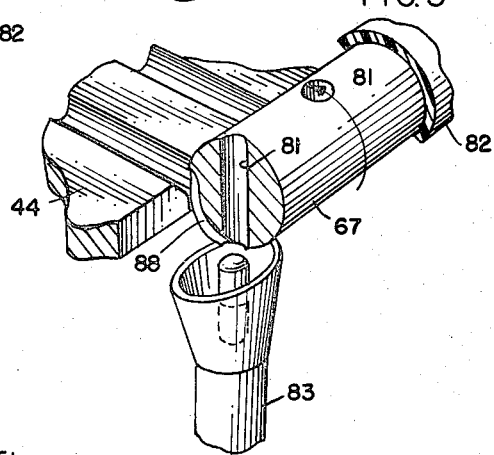
FIG. 5 is a view similar to FIG. 4, but showing the capsule receiving and discharging mechanism in its discharging position.

Each of the pockets 81 is in alignment with a discharge chute 83, when bar 67 moves to the discharge position seen in FIG. 5. Each discharge chute 83 has its lower end in proximity to the filler neck of a container 19. Each chute 83 is arranged to be held to a plate 84 extending upward from the stringer members 28 and 29, and is adjusted to proper position by means of an arcuate slot 86 formed in the plate 84 and each chute is held in position thereto by any suitable fastening means 87.

In order readily to provide for the movement of the next tier of capsules 25 into the pockets 81 which capsules are now in the bottommost tiered position in the guideways 47, each of the guideways 47 is in registration with a slot 88 formed in the periphery of the bar 67 and embracing approximately 90 degrees of central angle, such angle corresponding to the angular movement of the bar 67 in rocking from the capsule receiving position to the capsule discharge position.

As seen in FIGS. 7 and 8, the lower ends of the capsules 25 enter the annular slots 88, and upon return rocking movement of the bar 67 to a position where the pockets 81 thereof are in alignment with the capsules 25, each capsule will adopt a partly entrant position in the pockets 81. The completion of the movement of each capsule 25 into the pocket 81 is then achieved by the vibrating movement of the hopper bottom 34, the loading and discharging operation being initiated and completed by the operation of the rack 74 cooperating with the pinion 73.

Referring now to FIG. 10, at the completion of a loading operation at machine 15, the stop finger 23 is withdrawn and the containers 19 then move to a stop position against the finger 26 at the tablet counting and filling machine 16. Finger 23 at machine 15 remains in the withdrawn position until the containers have moved therepast, it then resumed a position as seen in FIG. 10, to stop another group of containers 19.

While the containers 19 move from the machine 15, stop finger 24 is withdrawn, finger 24 remaining in the withdrawn position until the conveyor reach 18 has moved the proper number of containers therepast, the finger 24 then resuming its extended position as seen in FIG. 10.

It will be seen from the description that there has been provided a simple and efficient mechanism for feeding a desiccant capsule to a container. Such desiccant capsule is preferably placed in the container before the container is filled and serves to reduce the humidity within the container to keep the contents dry.

The composition of the desiccant material within the desiccant capsule 25 forms no part of the present invention, and such capsule may contain anhydrous calcium chloride, silica-gel or the like.

While the invention has been described in terms of a preferred embodiment thereof, it is entirely within its scope that equivalent structures be employed, and the scope of the invention is not intended, therefore, to be limited by the precise embodiment shown, and only by the scope of the claims here appended.

We claim:

1. A machine for feeding capsules, containing a desiccant, to tablet or capsule containers incident to the movement of the containers through a tablet or capsule counting and packaging mechanism, the machine comprising a hopper having downwardly inclined side walls and a rear wall, the bottom having a plurality of spaced capsule guides extending to the discharge end thereof, a capsule-receiving and discharging bar having a plurality of radially disposed pockets extending therethrough, journaled adjacent the discharge end of the hopper bottom with the pockets aligned with the respective capsule guides in the hopper bottom, operating means connected to oscillate the bar clockwise and counterclockwise between a position to simultaneously receive capsules in each of the bar pockets directly from the respective hopper guides when said pockets are in a substantially horizontal position, and a position to simultaneously discharge capsules in a substantially vertical plane from each bar pocket into the respective containers and means to permit only capsules in said guides to leave the hopper.

2. A machine for feeding desiccant capsules as set forth in claim 1 wherein an arcuate-shaped, stationary sleeve concentrically embraces the bar in opposition to the discharge end of the hopper bottom to close the outer ends of the pockets when the bar is in its capsule-receiving and capsule-discharging positions.

3. A machine for feeding capsules, containing a desiccant, to tablet or capsule containers incident to the movement of the containers through a tablet or capsule counting and packaging mechanism, the machine comprising a hopper having downwardly inclined side walls and a rear wall, the bottom having a plurality of space capsule guides extending to the discharge end thereof, a capsule-receiving and discharging bar having a plurality of radially disposed pockets extending therethrough, journaled adjacent the discharge end of the hopper bottom with the pockets aligned with the respective capsule guides in the hopper bottom, operating means connected to oscillate the bar between a position to simultaneously receive capsules in each of the bar pockets directly from the respective hopper guides, and a position to simultaneously discharge capsules from each bar pocket into the respective containers, a quandrant-shaped, semicircular slot formed in the periphery thereof close to the receiving end of each pocket whereby, during the return movement of the bar from capsule-discharging position, subsequent capsules are positioned for a more facile subsequent entry into the respective pockets, and means to permit only capsules in said guides to leave said hopper.

4. The device according to claim 3 wherein the capsule guides slope downwardly from the rear end wall; and means for vibrating said bottom wall to effect downward and outward movement of the capsules in said guides.

References Cited

UNITED STATES PATENTS

| | | |
|---|---|---|
| 2,509,069 | 5/1950 | Mrachek. |
| 2,523,517 | 9/1950 | Potter _____ 53—59 XR |
| 2,905,797 | 9/1959 | Guyer et al. _____ 221—175 XR |

TRAVIS S. McGEHEE, *Primary Examiner.*

E. F. DESMOND, *Assistant Examiner.*

U.S. Cl. X.R.

221—93, 182, 265; 53—238